United States Patent
Oshima et al.

(10) Patent No.: US 7,225,461 B2
(45) Date of Patent: May 29, 2007

(54) METHOD FOR UPDATING SECURITY INFORMATION, CLIENT, SERVER AND MANAGEMENT COMPUTER THEREFOR

(75) Inventors: Satoshi Oshima, Tokyo (JP); Masahide Sato, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 193 days.

(21) Appl. No.: 10/656,507

(22) Filed: Sep. 4, 2003

(65) Prior Publication Data

US 2004/0111641 A1  Jun. 10, 2004

(30) Foreign Application Priority Data

Sep. 4, 2002  (JP)  ............... 2002-259190

(51) Int. Cl.
- G06F 15/16  (2006.01)
- G06F 9/00  (2006.01)
- G06F 17/30  (2006.01)

(52) U.S. Cl. .................. 726/3; 713/100; 707/200; 717/171

(58) Field of Classification Search ................ 713/200, 713/201; 709/217–219, 223, 224; 707/1, 707/9, 10, 200–204; 717/168–178

See application file for complete search history.

(56) References Cited

U.S. PATENT DOCUMENTS

| | | | |
|---|---|---|---|
| 5,652,908 A | 7/1997 | Douglas et al. | |
| 5,968,176 A | 10/1999 | Nessett et al. | |
| 6,202,157 B1 | 3/2001 | Brownlie et al. | |
| 6,266,774 B1 * | 7/2001 | Sampath et al. | 713/201 |
| 6,330,562 B1 * | 12/2001 | Boden et al. | 707/10 |
| 6,393,569 B1 | 5/2002 | Orenshteyn | |
| 6,430,561 B1 | 8/2002 | Austel et al. | |
| 6,453,418 B1 | 9/2002 | Ooki et al. | |
| 6,535,911 B1 | 3/2003 | Miller et al. | |
| 6,564,215 B1 * | 5/2003 | Hsiao et al. | 707/8 |
| 6,584,568 B1 | 6/2003 | Dircks et al. | |
| 6,594,763 B1 | 7/2003 | Madoukh | |
| 6,598,090 B2 | 7/2003 | Champlin | |
| 6,622,220 B2 | 9/2003 | Yoshida et al. | |
| 6,728,888 B2 | 4/2004 | Ooki et al. | |
| 6,754,696 B1 * | 6/2004 | Kamath et al. | 709/213 |
| 2001/0025346 A1 | 9/2001 | Kayashima et al. | |
| 2002/0016920 A1 | 2/2002 | Komure | |
| 2002/0073328 A1 | 6/2002 | Daniels et al. | |
| 2002/0108059 A1 | 8/2002 | Canion et al. | |
| 2002/0157010 A1 | 10/2002 | Dayan et al. | |
| 2002/0157016 A1 | 10/2002 | Russell et al. | |
| 2002/0162026 A1 | 10/2002 | Neuman et al. | |
| 2002/0169878 A1 | 11/2002 | Orenshteyn | |

(Continued)

FOREIGN PATENT DOCUMENTS

EP  1335564 A2  8/2003

(Continued)

*Primary Examiner*—Christopher Revak
(74) *Attorney, Agent, or Firm*—Townsend and Townsend and Crew LLP

(57) ABSTRACT

A method for updating information on security, in which the client is connected with a server through a network, the server including a storage device that is managed by the client, the storage device storing security information, the method comprising updating the security information stored in the storage device that the client manages in the server.

20 Claims, 7 Drawing Sheets

U.S. PATENT DOCUMENTS

| | | |
|---|---|---|
| 2002/0174348 A1 | 11/2002 | Ting |
| 2003/0023874 A1 | 1/2003 | Prokupets |
| 2003/0033523 A1 | 2/2003 | McNulty et al. |
| 2003/0061482 A1 | 3/2003 | Emmerichs |
| 2003/0126441 A1 | 7/2003 | Laux et al. |
| 2003/0131246 A1 | 7/2003 | Reeves et al. |
| 2003/0177389 A1 | 9/2003 | Albert et al. |
| 2003/0225667 A1 | 12/2003 | Sato |
| 2004/0006616 A1 | 1/2004 | Quinn et al. |
| 2004/0064713 A1 | 4/2004 | Yadav |
| 2004/0064724 A1 | 4/2004 | Himmel et al. |
| 2004/0064731 A1 | 4/2004 | Nguyen et al. |

FOREIGN PATENT DOCUMENTS

| | | |
|---|---|---|
| JP | 2000-20469 A | 1/2000 |
| JP | 2003-186728 A | 7/2003 |
| JP | 2003-296283 A | 10/2003 |
| WO | WO/03029940 A2 | 4/2003 |

* cited by examiner

FILE ATTRIBUTES

| FILE NAME | PATH NAME | DATE | | | OWNER NAME | GROUP NAME | OWNER | | | GROUP | | | OUTSIDE | | |
|---|---|---|---|---|---|---|---|---|---|---|---|---|---|---|---|
| | | CREATED | ALTERED | REFERENCED | | | READ | WRITE | IMPLEMENTATION | READ | WRITE | IMPLEMENTATION | READ | WRITE | IMPLEMENTATION |
| test.txt | ¥tmp¥ | 2000/2/3 | 2001/3/4 | 2001/4/5 | usera | groupa | PERMITTED | PERMITTED | NOT PERMITTED | PERMITTED | NOT PERMITTED | NOT PERMITTED | PERMITTED | NOT PERMITTED | 15 |
| foo.doc | ¥sys¥ | 2002/1/1 | 2002/1/1 | 2002/5/6 | root | root | PERMITTED | NOT PERMITTED | NOT PERMITTED | NOT PERMITTED | NOT PERMITTED | NOT PERMITTED | NOT PERMITTED | NOT PERMITTED | 23 |
| bar.exe | ¥bin¥ | 2000/2/3 | 2000/2/3 | 2002/5/6 | deamon | deamon | PERMITTED | PERMITTED | PERMITTED | PERMITTED | NOT PERMITTED | PERMITTED | PERMITTED | NOT PERMITTED | 48 |
| ... | | | | | | | | | | | | | | | |

FIG. 2

ALLOCATION TABLE (4-8 BYTES/CELL)

|    | 0  | 1  | 2  | 3  | 4  | 5  | 6  | 7  | 8  | 9  |
|----|----|----|----|----|----|----|----|----|----|----|
| 0  |    |    | 5  |    |    | 8  |    |    | 63 |    |
| 10 |    |    |    |    |    | 16 | 17 | 18 | 19 | 20 |
| 20 | 0  |    |    | 24 | 25 | 30 |    |    |    |    |
| 30 | 31 | 32 | 33 | 0  |    |    |    |    |    |    |
| 40 |    |    |    |    |    |    |    |    | 2  |    |
| 50 |    |    |    |    |    |    |    |    |    |    |
| 60 |    |    |    | 67 |    |    |    | 0  |    |    |
| ... |   |    |    |    |    |    |    |    |    |    |

FIG. 3

CLUSTER (4-32 BYTES/CELL)

|    | 0 | 1 | 2 | 3 | 4 | 5 | 6 | 7 | 8 | 9 |
|----|---|---|---|---|---|---|---|---|---|---|
| 0  |   |   | * |   |   | * |   |   | * |   |
| 10 |   |   |   |   |   | * | * | * | * | * |
| 20 | * |   |   | * | * | * |   |   |   |   |
| 30 | * | * | * | * |   |   |   |   |   |   |
| 40 |   |   |   |   |   |   |   |   | * |   |
| 50 |   |   |   |   |   |   |   |   |   |   |
| 60 |   |   |   | * |   |   |   | * |   |   |
| ... |  |   |   |   |   |   |   |   |   |   |

FIG. 4

METHOD FOR UPDATING SECURITY INFORMATION, CLIENT, SERVER AND MANAGEMENT COMPUTER THEREFOR

CROSS-REFERENCE TO RELATED APPLICATIONS

The present application claims priority upon Japanese Patent Application No. 2002-259190 filed on Sep. 4, 2002, which is herein incorporated by reference.

BACKGROUND OF THE INVENTION

1. Field of the Invention

The present invention relates to a method for updating security information, and to a client, a server and a management computer for use in the method.

2. Description of the Related Art

As shown in FIG. 7, a client that is connected to a server through a network comprises a CPU, a memory, a network interface, and a storage (local disk device) constituted by a hard disk device. An OS (Operating System), security software, and an application program are deployed in the memory. Various files are stored in the storage. These various files are a file group making up the OS, a policy file group, and a group of other files. The group of other files includes security software, an application program, data files (referred to simply as files as appropriate), and a file system. Various file management information, such as respective file attributes and a file allocation table, are described in the file system (e.g., see Yasuharu Murase, Nyumon MS-DOS kaitei shinpan ("Introduction to MS-DOS, Newly Revised Edition"), ASCII Corporation, Aug. 11, 1991, pp. 63–64).

As shown in FIG. 8, under the typical OS control, when the application program requests access to a file (S10), the file system is referenced by a file access control function, and it is determined whether or not access is to be permitted (S20). When access is permitted by this determination, the application program can access the file by a drive (S30->S40). The file that the application program accesses also includes files of the server connected through the network. That is, files of the server connected through the network are accessed by a network drive and a network card (S50->S60->S70).

Examples of the content of the file system stored in the storage include file attributes (see FIG. 2; e.g., see Yasuharu Murase, Nyumon MS-DOS kaitei shinpan ("Introduction to MS-DOS, Newly Revised Edition"), ASCII Corporation, Aug. 11, 1991, pp. 131–132), an allocation table (see FIG. 3), and a cluster (see FIG. 4). As shown in the file attributes of FIG. 2, attributes such as file names, path names, owners, and group names are made to correspond to each file. Particularly in relation to access to the respective files by users, such as the owners, groups, and the outside, respective headings of read ("read" in FIG. 2), write ("write" in FIG. 2), and implementation are disposed. Attributes relating to access columns of permitted ("permitted" in FIG. 2) and not permitted ("not permitted" in FIG. 2) are made to correspond to each of these headings.

The security software shown in FIG. 7 is software that is added to the OS and strengthens the access control function. The security software provides precise access control to further raise security on the basis of access control information described in the policy file. Detailed attributes, such as users, applications, and periods of time, are specified in the policy file as conditions permitting access to files.

A virus pattern file and a signature file are included in the policy file. The virus pattern file is used in virus countermeasure software called anti-virus software. The signature file is used in network attack countermeasure software called a host intrusion detection system. The anti-virus software inspects files, periodically or while a file is open, for the presence of computer virus infections on the basis of a pattern indicative of the characteristics of a computer virus, and appropriately takes necessary action. The host intrusion detection system identifies a network packet called a signature, detects attacks through the network, monitors e.g., a log file that the implemented application program outputs, and detects attacks.

The policy (security policy) referred to herein is security information generically naming limitations relating to use of a computer. In other words, the policy includes not only information for prohibiting the implementation of specific applications and preventing changes to settings, but also various kinds of software.

Next, the updating of the policy file in the network environment will be described. As shown in FIG. 9, first, when power is turned on and the client starts up (S100), the OS thereof is activated (S110). Services resulting from a network connection and various pieces of software are started up (S120) by a control of the activated OS, whereby the transmission and reception of data via the network become possible. The updating function of the policy file is started up by the implementation of the security software (S130), and the client receives updates of the policy file from a management computer through the network. That is, the client receives the latest version of the policy file from the management computer (S140). Thus, the client is allowed to implement various processing corresponding to operational inputs by a user (S150).

In the above conventional technology, the policy file is stored in a storage equipped with the client. Thus, the policy file naturally cannot be updated while the operation of the client is stopped. For this reason, access control, virus countermeasures, etc., cannot be conducted in the latest state during the period of time until the policy file is updated.

As shown in the flow chart of FIG. 9, because the policy file of the client is updated after start-up, the client is operated with the old version of the security information during the period of time from start-up until the security information is updated. In particular, network-infecting viruses attack devices connected to the network. Thus, the client is ordinarily in a state in which it is vulnerable to attack during the period of time from start-up until the security information is updated.

Moreover, in relation to updating of the policy, updating of the policy must be implemented with regard to each of a plurality of clients, and the entire management burden of each client becomes enormous.

SUMMARY OF THE INVENTION

An object of the present invention is to provide a method for updating security information even when operation of the client is stopped.

In order to accomplish the above and other objects, according to a first aspect of the present invention, there is provided a method for updating information on security, in which the client is connected with a server through a network, with the server including a storage device that is managed by the client, the storage device storing security information of the client, the method comprising updating the security information of the client stored in the storage device that the client manages in the server.

According to a second aspect of the present invention there is provided a client connected to a server through a network, the server including a storage device, comprising means for managing the storage in the server, the storage device storing security information, the security information being updated without operation of the client, and means for referencing the security information of the client.

According to a third aspect of the present invention there is provided a server connected to a client through a network comprising means for communicating with the client through the network, and a storage device that is managed by the client, the storage device storing security information to be updated.

According to a fourth aspect of the present invention there is provided a management computer connected through a network to a server, the server including a storage device that is managed by a client, the storage device storing security information of the client, comprising means for communicating with the server through the network, and means for updating the security information.

BRIEF DESCRIPTION OF THE DRAWINGS

For a more complete understanding of the present invention and the advantages thereof, reference is now made to the following description taken in conjunction with the accompanying drawings wherein:

FIG. 2 is a chart showing file attributes in the embodiment according to the present invention;

FIG. 3 is a chart showing an allocation table in the embodiment according to the present invention;

FIG. 4 is a chart showing the structure of a cluster in the embodiment according to the present invention;

DESCRIPTION OF THE PREFERRED EMBODIMENT

At least the following matters will be made clear by the explanation in the present specification and the description of the accompanying drawings.

A client is constituted by a so-called diskless computer that does not include a local hard disk device. In the present embodiment, this client will be called a "diskless client."

Figure 1:
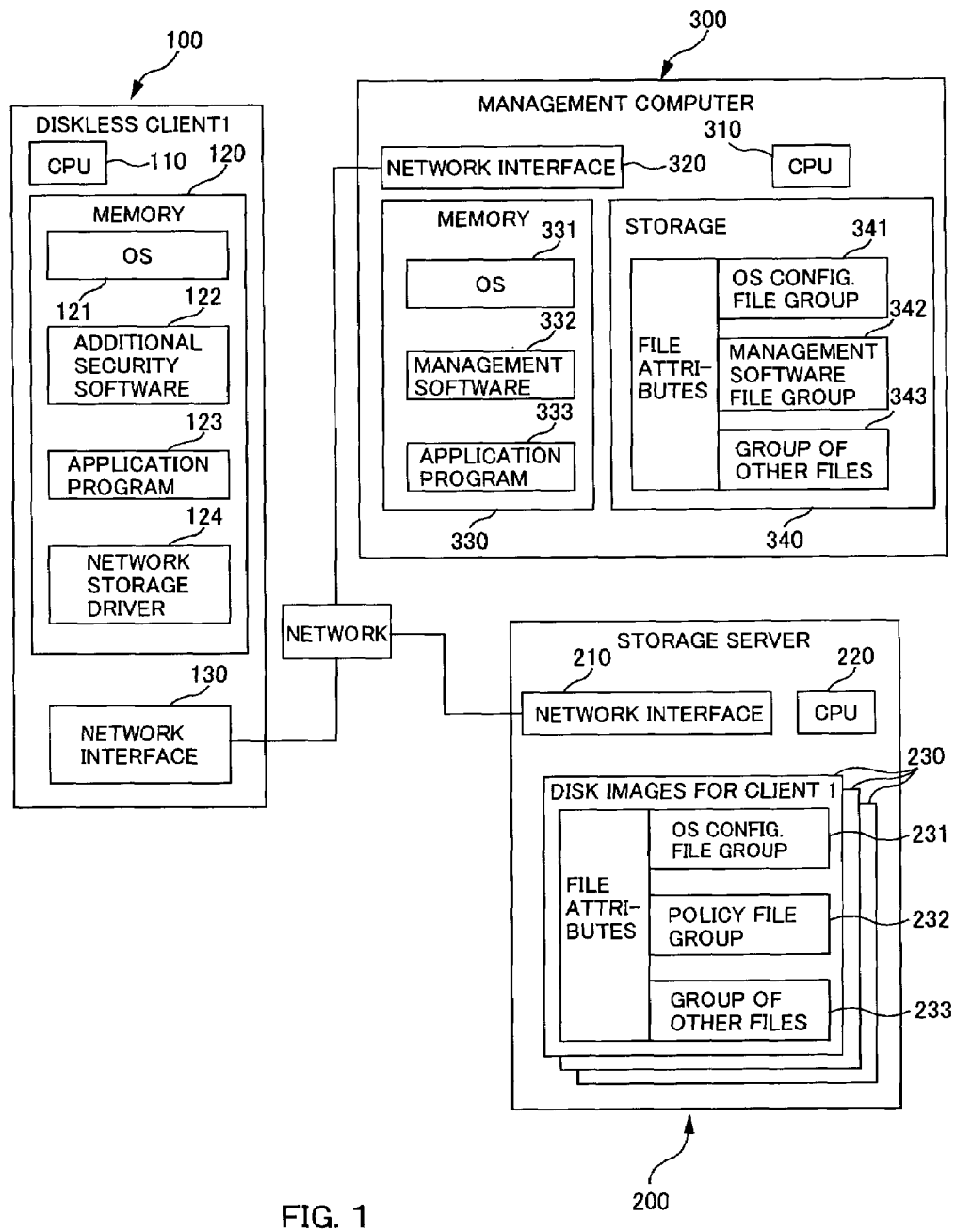
FIG. 1 is a system block diagram showing an embodiment according to the present invention.

As shown in FIG. 1, one or a plurality of diskless clients 100 are connected through a network to a server 200 referred to as a "storage server." A management computer 300 is connected through the network to the server 200. It should be noted that the management computer 300 may be omitted by having the server 200 include the function(s) of the management computer 300.

Similar to convention, the diskless client 100 is equipped with a CPU 110, a memory 120, and a network interface 130.

An OS 121, security software 122, an application program 123, and a network storage driver 124 are read out from the server 200 and deployed in the memory 120. The diskless client 100 gives to the server 200 the function of a storage device as disk images 230.

That is, the diskless client 100 does not include a local disk device, but is mounted with a hard disk device (storage, storage device) of the server 200. The network storage driver 124 of the diskless client 100 controls the disk of the mounted server 200 via the network.

Figure 7:
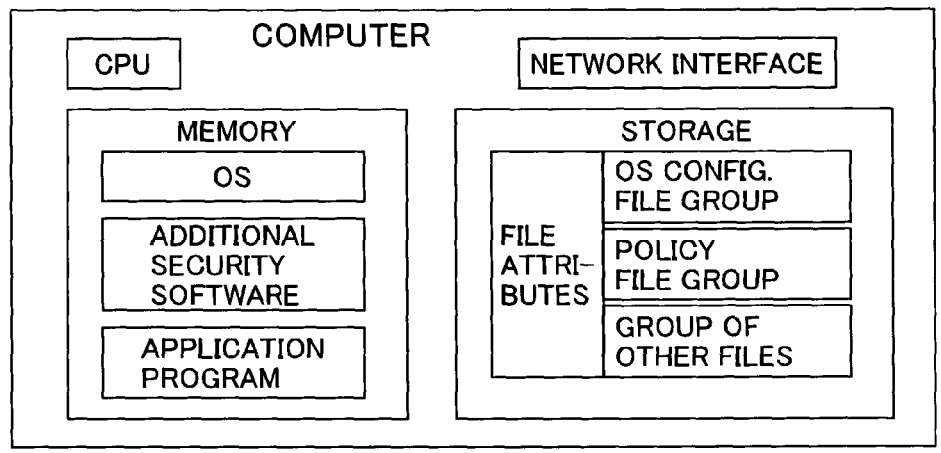
FIG. 7 is a block diagram showing the structure of a client in the embodiment according to the present invention.
Figure 8:
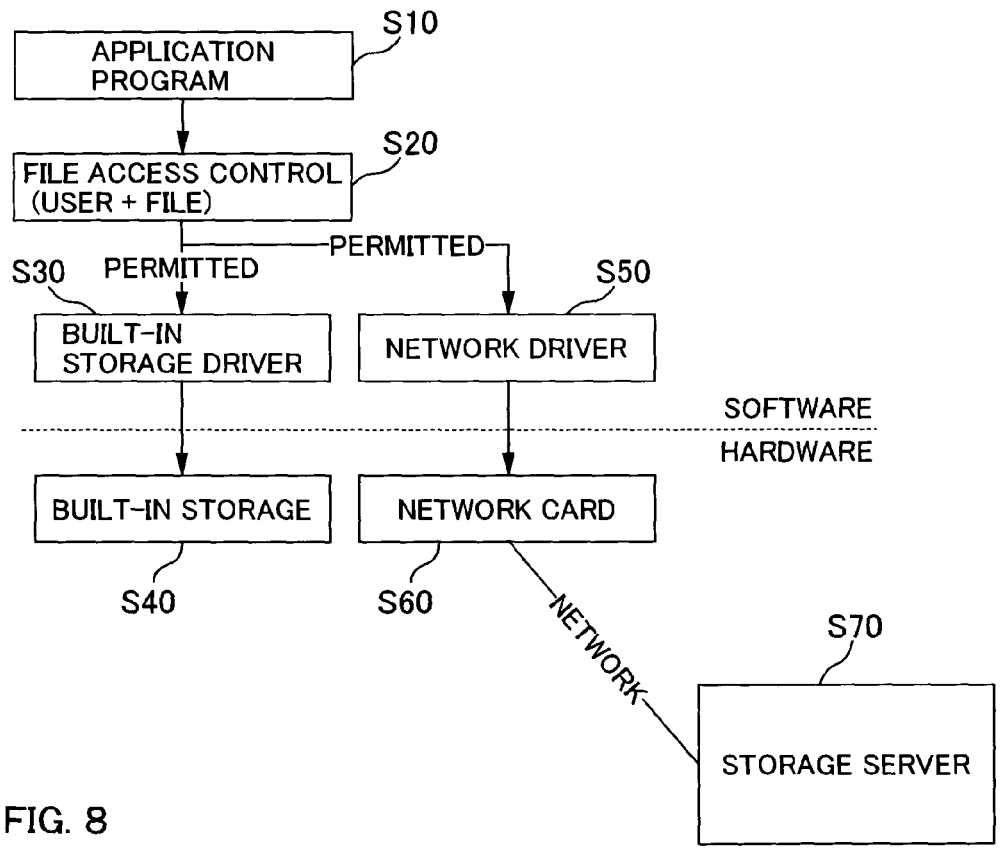
FIG. 8 is a flow chart showing control of access to a file by a conventional client.
Figure 9:
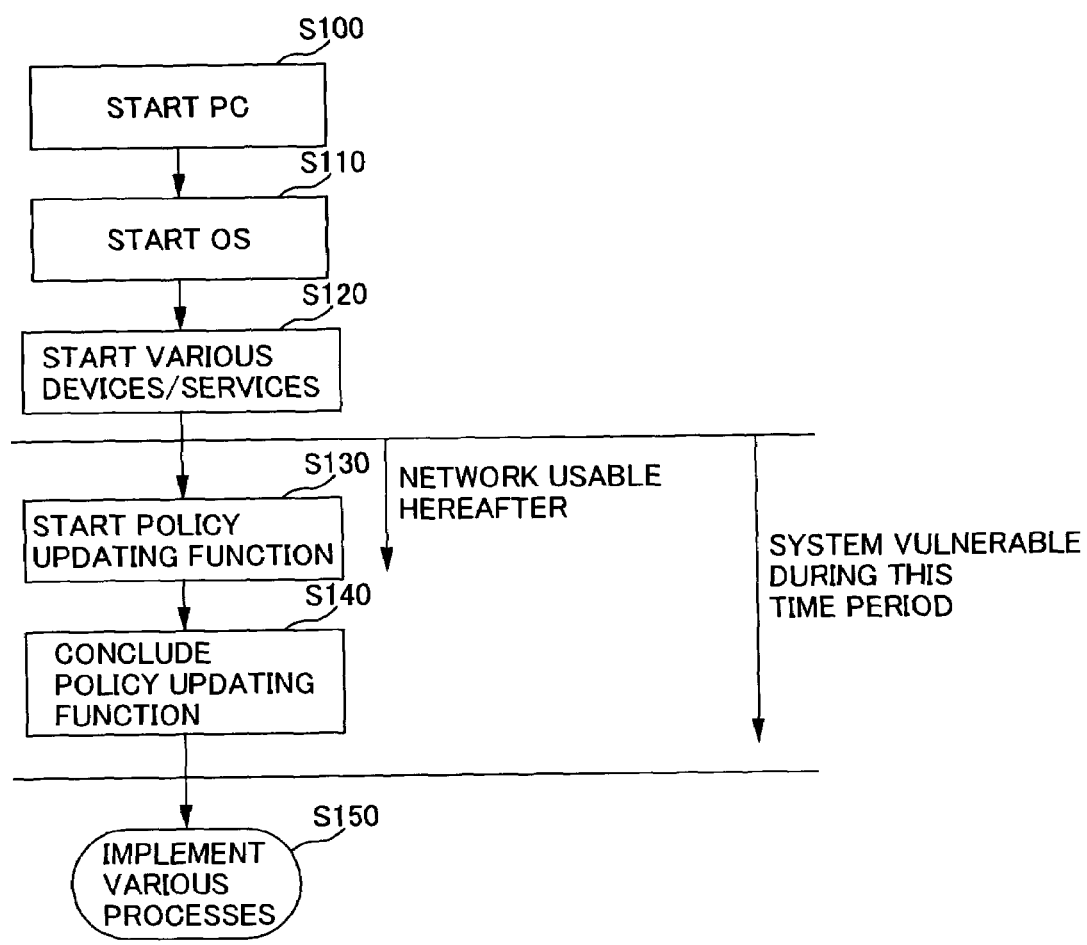
FIG. 9 is a flow chart showing updating of a policy file by a conventional client.

The server 200 includes a network interface 210 and a CPU 220, and also includes a plurality of hard disk devices that each diskless client 100 manages. The server 200 may also operate on, for example, a RAID (Redundant Array of Inexpensive Disks) format. The disk images 230 that the diskless client 100 uses are stored in the hard disk device. There is a disk image 230 present for each diskless client 100. The disk images 230 are file groups that are the same as the ones stored in the storage (hard disk device) of the conventional client shown in FIG. 7.

That is, the disk images 230 that the diskless client 100 uses are an OS configuration file group 231 relating to the configuration of the OS, a policy file group 232, and a group 233 of other files. Security information that is the same as that of the aforementioned conventional technology is included in these file groups 231 to 233.

That is, the policy file 232 is constituted by the aforementioned access control information, the virus pattern file, the signature file, and the like. The group 233 of other files includes the application program 123, data files that software and/or programs use, and the network storage driver 124. Additionally, various file management information shown in FIGS. 2 to 4, such as file attributes and a file allocation table, is included as a file system in the group 233.

The management computer 300 includes a CPU 310, a memory 330, a network interface 320, and a storage 340 that is constituted by a hard disk device. An OS 331, management software 332, and an application program 333 are deployed in the memory 330. Various file groups 341 to 343, such as an OS, management software, an application program, and data files, are stored in the storage 340. The management software 332 uses the management software file group 342 to update the content of the various file groups 341 to 343 in the disk images 230 of the server 200, i.e., the security information, to update them to the latest versions.

Figure 5:
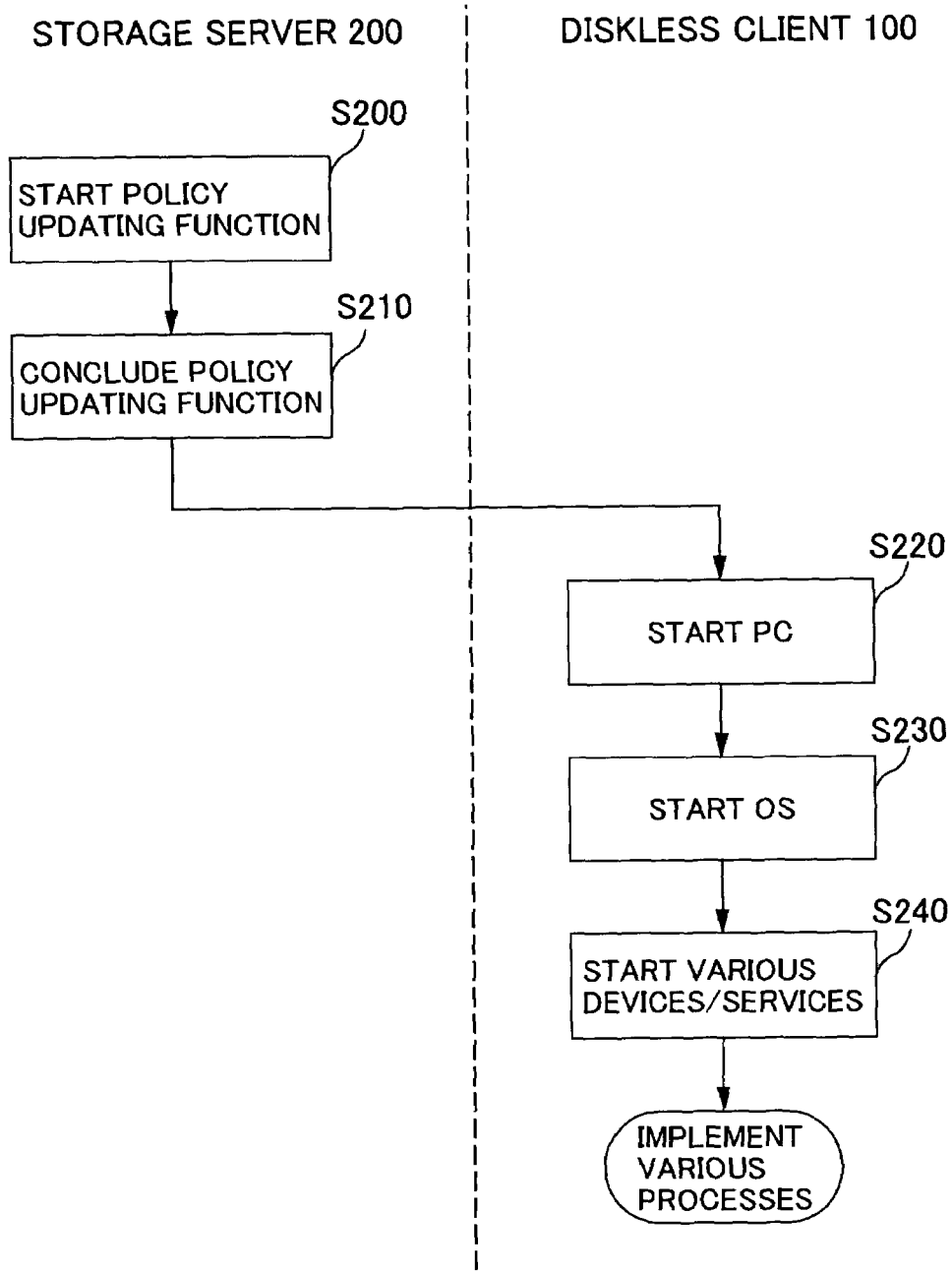
FIG. 5 is a flow chart showing a policy update sequence in the embodiment according to the present invention.

FIG. 5 shows a specific updating sequence of the policy. As shown in FIG. 1, contrary to convention, the policy that the diskless client 100 uses is included in the various file groups 231 to 233 that the server 200 retains. As needed, the server 200 starts up the updating function of the policy (S200), appropriately receives the latest versions of the various file groups 231 to 233 from the management computer 300, and concludes the updating of the policy (S210). Thus, the updating of the policy, such as the file attributes, user ID, and various virus countermeasures, is conducted in the entire network to which the server 200 is connected. Thus, the latest security is secured with respect to unauthorized access and virus infiltration and attacks.

After updating of the policy has been concluded, the diskless client 100 starts up (S220). Specifically, when the diskless client 100 is turned on, an IPL (Initial Program Loader) is started up. A basic OS is called up from the disk images 230 of the server 200 through the network by the action of the IPL, and the basic OS is deployed in the memory 120 of the diskless client 100. The diskless client 100 begins operation as a computer by the deployed basic OS beginning operation (S230).

Services resulting from the network connection and various pieces of software are started by the control of the started OS (S240), whereby it becomes possible for the diskless client 100 to transmit and receive data through the network. When the diskless client 100 that has begun operation receives input of authentication information such as the ID (user name) and password of the user, it checks these with authentication information registered within the files groups 231 and 232 within the disk images 230 of the server 200. When the validity of the authentication information including the group ID (group name) has been authenticated as a result of the checking, use of the client by the user is made possible.

Additional access control for raising security by the security software 122 will be described in a case where the application program is operated by the diskless client 100. The security software 122 is software added to the OS in order to strengthen the access control function. The security software 122 conducts precise access control for further raising security on the basis of the access control information described in the policy file. Detailed attributes, such as users, applications, and periods of time of day, are specified in the policy file as conditions permitting access to files that the application program and the like use.

Figure 6:
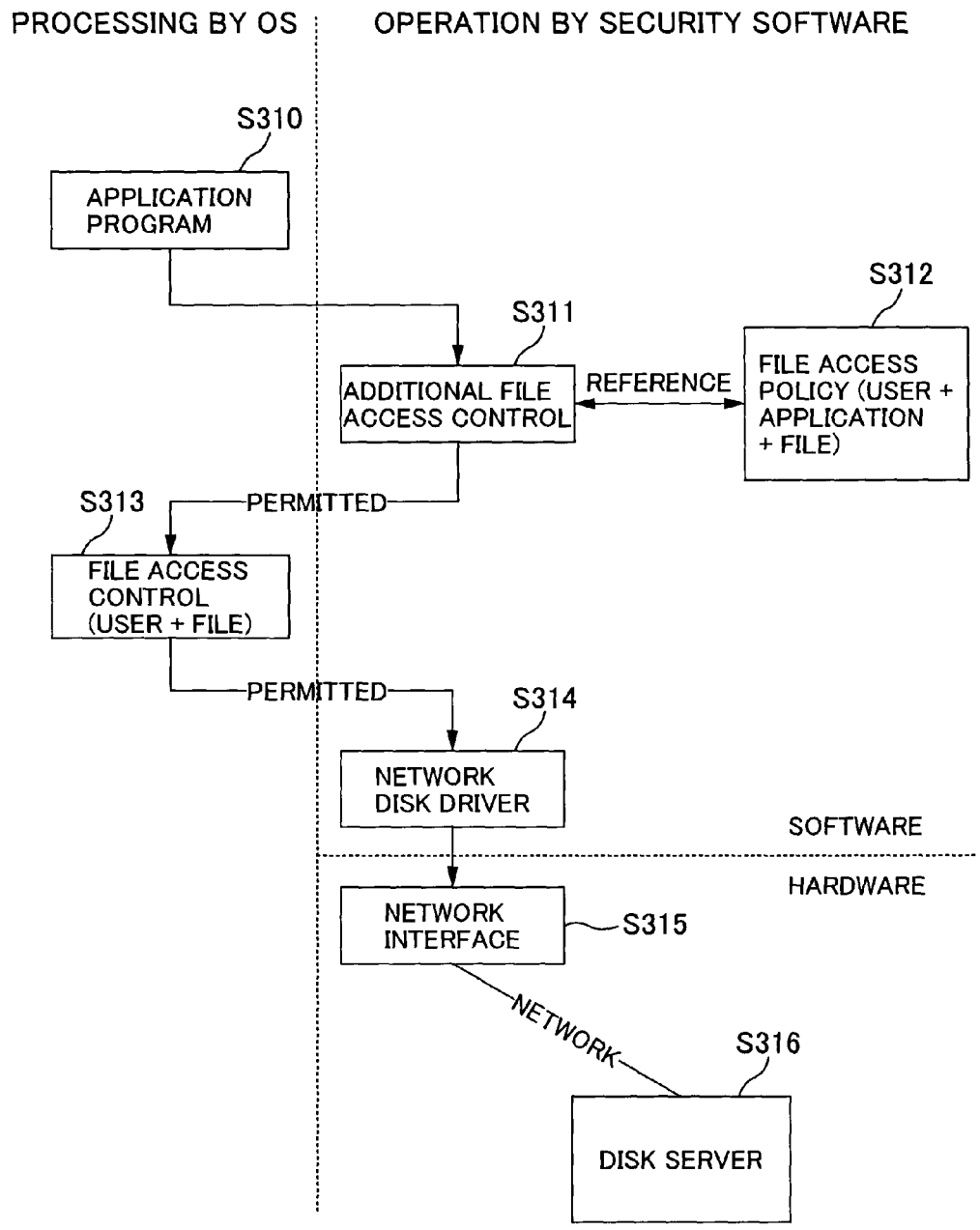
FIG. 6 is a flow chart showing additional access control of a file in the embodiment according to the present invention.

That is, as shown in the flow chart of FIG. 6, when the application program 123 requests access to a file within the disk images 230 of the server 200 under the control of the OS (S310), additional file access control by the security software 122 functions (S311). The policy file 232 within the disk images 230 of the server 200 is referenced by the file access control, and the policy is authenticated with regard to the file(s) whose access has been requested (S312). The policy is information specifying the application, user ID permitting access, and attributes relating to each file. When file access by the application is permitted as a result of the authentication of the policy, next, the file access control by the OS functions. The file system is referenced by the file access control of the OS with regard to the file(s) whose access has been requested, and the file attributes shown in FIG. 4 are verified (S313). When access is permitted by the user ID matching or the like as a result of this verification, the network storage drive 124 accesses the file(s) within the disk images 230 of the server 200 through the network interface 130 (S314->S315->S316).

Although an embodiment of the invention has been specifically described on the basis of that embodiment, the invention is not limited thereto and can be variously altered in a range that does not deviate from the gist thereof.

The following effects are provided with the embodiment of the invention.

The disk that the diskless client manages and uses is mounted on the server on the network. Additionally, the disk images of the client including the policy (security information) and files are stored in the disk mounted in the server. The management computer updates the policy in the disk images.

Thus, regardless of whether or not operation of the client is stopped, the policy (security information) can be updated as needed. Therefore, updating of the policy is already concluded at the point in time when the stopped client is started up. Thus, the client is operated according to the continually updated policy.

Even in a case where a plurality of clients mount disks on a single server, updating can be accomplished simply by updating the policy of the server. For example, the policy of the server is updated through the management computer. That is, there is no need to implement updating of the policy with regard to each client as has conventionally been the case, and the management burden of each client can be greatly reduced.

Even when operation of the client is stopped, the security information can be updated.

Although the preferred embodiment of the present invention has been described in detail, it should be understood that various changes, substitutions and alterations can be made therein without departing from spirit and scope of the inventions as defined by the appended claims.

What is claimed is:

1. A method for updating information on security, in which a plurality of clients are connected with a storage apparatus through a network, said storage apparatus storing security information, said method comprising:
    storing operation systems, application programs, and data of said plurality of clients in said storage apparatus;
    sending said operation systems and said application programs to said plurality of clients when said plurality of clients are initiated in response to requests from said plurality of clients; and
    updating said security information stored in said storage apparatus,
    wherein said plurality of clients do not include a local disk device, and
    said storage apparatus includes a program configured to update security information of said plurality of clients before said plurality of clients are initiated.

2. A method for updating information on security according to claim 1, wherein said storage apparatus is connected to a management computer through said network and wherein said updating said security information is conducted by said management computer.

3. A method for updating information on security according to claim 1, wherein said storage apparatus stores files that said clients use, and
    wherein said security information includes attributes relating to said files that said clients use.

4. A method for updating information on security according to claim 1, wherein said clients reference said security information of said clients.

5. A method for updating information on security, in which a plurality of clients are connected with a storge apparatus through a network, said storage apparatus storing security information, said method comprising:
    storing operation systems, application programs, and data of said plurality of clients in said storage apparatus:
    sending said operation systems and said application programs to said plurality of clients when said plurality of clients are initiated in response to requests from said plurality of clients; and
    updating said security information stored in said storage apparatus,
    wherein said plurality of clients do not include a local disk device, and
    said storage apparatus includes a program configured to update security information of said plurality of clients regardless of whether or not said plurality of clients are initiated;
    wherein said storage apparatus stores files that said clients use, and wherein said security information includes attributes relating to said files that said clients use:
    wherein said security information includes access control information with respect to said files that said clients use.

6. A method for updating information on security, in which a plurality of clients are connected with a storage apparatus through a network, said storage apparatus storing security information, said method comprising:

storing operation systems, application programs, and data of said plurality of clients in said storage apparatus;

sending said operation systems and said application programs to said plurality of clients when said plurality of clients are initiated in response to requests from said plurality of clients; and updating said security information stored in said storage apparatus, wherein said plurality of clients do not include a local disk device, and said storage apparatus includes a program configured to update security information of said plurality of clients regardless of whether or not said plurality of clients are initiated;

wherein said clients reference said security information of said clients;

wherein said security information includes authentication information for permitting use of said clients by a user.

7. A plurality of clients connected through a network, said plurality of clients comprising:

a storage apparatus storing security information, said storage apparatus including a program configured to update security information of a plurality of clients before said plurality of clients are initiated; and a unit referencing said security information, wherein said plurality of clients do not include a local disk device, and said storage apparatus is configured to store operation systems, application programs, and data of said plurality of clients in said storage apparatus; and to send said operation systems and said application programs to said plurality of clients when said plurality of clients are initiated in response to requests from said plurality of clients.

8. A plurality of clients according to claim 7, wherein a management computer is connected to said storage apparatus through said network and said security information of said clients is updated by said management computer.

9. A plurality of clients according to claim 7, wherein said storage apparatus stores files that said clients use, and wherein said security information includes attributes relating to said files that said clients use.

10. A plurality of clients connected through a network, said plurality of clients comprising:

a storage apparatus storing security information, said storage apparatus including a program configured to update security information of a plurality of clients regardless of whether or not said plurality of clients are initiated; and a unit referencing said security information, wherein said plurality of clients do not include a local disk device, and said storage apparatus is configured to store operation systems, application programs, and data of said plurality of clients in said storage apparatus: and to send said operation systems and said application programs to said plurality of clients when said plurality of clients are initiated in response to requests from said plurality of clients;

wherein said storage apparatus stores files that said clients use, and wherein said security information includes attributes relating to said files that said clients use;

wherein said security information of said clients includes access control information with respect to said files that said clients use.

11. A plurality of clients connected through a network, said plurality of clients comprising:

a storage apparatus storing security information, said storage apparatus including a program configured to update security information of a plurality of clients regardless of whether or not said plurality of clients are initiated; and a unit referencing said security information, wherein said plurality of clients do not include a local disk device, and said storage apparatus is configured to store operation systems, application programs, and data of said plurality of clients in said storage apparatus: and to send said operation systems and said application programs to said plurality of clients when said plurality of clients are initiated in response to requests from said plurality of clients;

wherein said security information includes authentication information for permitting use of said clients by a user.

12. A storage apparatus connected to a plurality of clients through a network, said storage apparatus comprising:

a unit communicating with said plurality of clients through said network, wherein said storage apparatus includes a program configured to update security information of said plurality of clients before said plurality of clients are initiated;

wherein said plurality of clients do not include a local disk device, and said storage apparatus is configured to store operation systems, application programs, and data of said plurality of clients in said storage apparatus; and to send said operation systems and said application programs to said plurality of clients when said plurality of clients are initiated in response to requests from said plurality of clients.

13. A storage apparatus according to claim 12, wherein a management computer is connected to said storage apparatus through said network and said security information is updated by said management computer.

14. A storage apparatus according to claim 12, wherein said storage apparatus stores files that said clients use, and wherein said security information includes attributes relating to said files that said clients use.

15. A storage apparatus according to claim 12, wherein said security information is referenced by said clients.

16. A storage apparatus according to claim 15, wherein said security information includes authentication information for permitting use of said clients by a user.

17. A storage apparatus connected to a plurality of clients through a network, said storage apparatus comprising:

a unit communicating with said plurality of clients through said network, wherein said storage apparatus includes a program configured to update security information of said plurality of clients regardless of whether or not said plurality of clients are initiated, wherein said plurality of clients do not include a local disk device, and said storage apparatus is configured to store operation systems, application programs, and data of said plurality of clients in said storage apparatus; and to send said operation systems and said application programs to said plurality of clients when said plurality of clients are initiated in response to requests from said plurality of clients;

wherein said storage apparatus stores files that said clients use, and wherein said security information includes attributes relating to said files that said clients use;

wherein said security information includes access control information with respect to said files that said clients use.

18. A management computer connected through a network to a storage apparatus and a plurality of clients, said storage apparatus storing security information, said management computer comprising:

a unit communicating with said storage apparatus through said network, wherein said storage apparatus includes a program configured to update security information of said plurality of clients before said plurality of clients are initiated, wherein said plurality of clients do not include a local disk device, and said storage apparatus is configured to store operation systems, application programs, and data of said plurality of clients in said storage apparatus; and to send said operation systems and said application programs to said plurality of clients when said plurality of clients are initiated in response to requests from said plurality of clients.

19. A method for updating information on security in a plurality of clients and a storage apparatus connected with each other through a network, said storage apparatus configured to store a file to be accessed by said clients and security information to be used in access control for said file, said method comprising:

in said storage apparatus, receiving security information from a management computer connected via the network, and updating said security information stored in said storage apparatus to the received security information, and in said plurality of clients, each time said plurality of clients access said file stored in said storage apparatus, referencing said security information stored in said storage apparatus, and performing access control for said file based on said security information, wherein said storage apparatus includes a program configured to update security information of said plurality of clients before said plurality of clients are initiated, wherein said plurality of clients do not include a local disk device, and said storage apparatus is configured to store operation systems, application programs, and data of said plurality of clients in said storage apparatus; and to send said operation systems and said application programs to said plurality of clients when said plurality of clients are initiated in response to requests from said plurality of clients.

20. A method for updating information on security, in which a plurality of clients are connected with a storage apparatus through a network, said storage apparatus storing security information, said method comprising:

storing operation systems, application programs, and data of said plurality of clients in said storage apparatus;

sending said operation systems and said application programs to said plurality of clients when said plurality of clients are initiated in response to requests from said plurality of clients; and updating said security information stored in said storage apparatus, wherein said plurality of clients do not include a local disk device, and said storage apparatus includes a program configured to update security information of said plurality of clients before said plurality of clients are initiated;

wherein said security information includes access control information with respect to said files that said clients use;

wherein said security information includes authentication information for permitting use of said clients by a user.

* * * * *